United States Patent
Heimbrock et al.

(10) Patent No.: US 6,662,488 B1
(45) Date of Patent: Dec. 16, 2003

(54) FISH CONTAINMENT DEVICE

(76) Inventors: Richard H. Heimbrock, 1041 Pineknot Dr., Cincinnati, OH (US) 45238; Steven V. McCaig, 1139 Tekulve Rd., Batesville, IN (US) 47006

(*) Notice: Subject to any disclaimer, the term of this patent is extended or adjusted under 35 U.S.C. 154(b) by 0 days.

(21) Appl. No.: 10/213,639

(22) Filed: Aug. 7, 2002

Related U.S. Application Data

(60) Provisional application No. 60/311,564, filed on Aug. 10, 2001.

(51) Int. Cl.$^7$ ............................................. A01K 97/20
(52) U.S. Cl. ..................................... 43/55; 206/315.11
(58) Field of Search .................. 43/55, 54.1; 383/119, 383/117, 104, 67; 135/124–126, 128; 56/328.1; 206/315.11

(56) References Cited

U.S. PATENT DOCUMENTS

| | | | | |
|---|---|---|---|---|
| 464,380 A | * | 12/1891 | McClay | 56/328.1 |
| 558,022 A | * | 4/1896 | Aspden | 383/67 |
| 636,381 A | * | 11/1899 | Hamel | 43/55 |
| 1,098,949 A | * | 6/1914 | Larrabee | 56/328.1 |
| 1,111,937 A | * | 9/1914 | Zoulek | 383/72 |
| 1,170,960 A | * | 2/1916 | Canterbury | 56/328.1 |
| 1,188,257 A | * | 6/1916 | Ekstrom | 383/119 |
| 1,276,453 A | * | 8/1918 | Tussing | 56/328.1 |
| 1,404,163 A | * | 1/1922 | Pim | 56/328.1 |
| 1,725,864 A | * | 8/1929 | James | 43/55 |
| 1,965,040 A | * | 7/1934 | Kelly | 383/67 |
| 2,487,506 A | * | 11/1949 | Zaleski | 396/591 |
| 2,575,893 A | * | 11/1951 | Seaman | 43/55 |
| 2,603,028 A | * | 7/1952 | Roberts | 43/55 |
| 2,706,657 A | * | 4/1955 | Talley | 56/328.1 |
| 2,736,157 A | * | 2/1956 | Weathersby | 56/328.1 |
| 2,739,409 A | * | 3/1956 | Sokolik | 43/55 |
| 2,943,432 A | * | 7/1960 | Colon | 56/328.1 |
| 2,961,802 A | * | 11/1960 | Mongan et al. | 135/124 |
| 3,158,188 A | * | 11/1964 | Esty | 43/55 |
| 3,559,329 A | * | 2/1971 | Chiu | 43/55 |
| 3,675,667 A | * | 7/1972 | Miller | 135/126 |
| 3,888,486 A | * | 6/1975 | Sutter et al. | 383/117 |
| 3,960,161 A | * | 6/1976 | Norman | 135/126 |
| 3,990,463 A | * | 11/1976 | Norman | 135/126 |
| 4,211,266 A | * | 7/1980 | Massey | 383/117 |
| 4,251,943 A | * | 2/1981 | Sawlsville | 43/55 |
| 4,498,190 A | * | 2/1985 | Garlick, III | 43/55 |
| 4,570,374 A | * | 2/1986 | Baxley | 43/55 |
| 4,703,577 A | * | 11/1987 | Gubash | 43/54.1 |
| 4,731,627 A | * | 3/1988 | Chisholm | 135/87 |
| 4,825,892 A | * | 5/1989 | Norman | 135/126 |
| 4,890,413 A | * | 1/1990 | Nelson et al. | 43/55 |
| 4,905,404 A | * | 3/1990 | Pasion et al. | 43/55 |
| 4,951,333 A | * | 8/1990 | Kaiser et al. | 135/126 |
| 4,985,721 A | * | 1/1991 | Moon | 383/119 |
| 5,249,592 A | * | 10/1993 | Springer et al. | 135/126 |
| 5,394,897 A | * | 3/1995 | Ritchey et al. | 135/124 |
| 6,109,282 A | * | 8/2000 | Yoon | 135/126 |

FOREIGN PATENT DOCUMENTS

| | | | | |
|---|---|---|---|---|
| EP | 508808 A1 | * | 10/1992 | |
| FR | 774988 A1 | * | 10/1934 | 43/55 |
| FR | 2789548 B1 | * | 8/2000 | |
| GB | 532802 A1 | * | 1/1941 | 43/55 |
| GB | 2215172 A1 | * | 9/1989 | 43/54.1 |
| GB | 2271702 B1 | * | 4/1994 | |
| GB | 2301009 B1 | * | 11/1996 | |

\* cited by examiner

*Primary Examiner*—Darren W. Ark
(74) *Attorney, Agent, or Firm*—Neal O. Willmann

(57) ABSTRACT

A collapsible containment device, which can be neatly folded and easily carried or stored in a fisherman's tackle box, serves as a live well for the storage and preservation of fish, typically game fish, features a receptacle having at least one opening for the insertion and removal of fish and a tube member having an opening at each end: one opening for inserting fish into the tube member and another in communication with the opening in the receptacle to permit transferring fish into the receptacle.

11 Claims, 3 Drawing Sheets

FISH CONTAINMENT DEVICE

CROSS REFERENCE TO RELATED APPLICATION

This application claims the benefit of Provisional Patent Application No. 60/311,564 filed Aug. 10, 2001.

FIELD OF THE INVENTION

This invention describes a collapsible and easily transported retaining or containment device that functions as a live well for the storage and preservation of fish. The containment device has been designed to be used primarily by game fishermen, and it is intended to be used from the bank of a stream, the shore of a lake and/or the side of a dock or boat.

DESCRIPTION OF THE PRIOR ART

Game fish, after being removed from the hook, are typically stored in creels, in live wells, in collapsible baskets and on stringers. Most of the collapsible retaining devices are easily transportable, and some are buoyed to float. U.S. Pat. No. 4,703,577 dated Nov. 3, 1987, which issued to Gubash, and U.S. Pat. No. 4,905,404 dated Mar. 6, 1990, which issued to Pasion et al. are illustrative and typical of containment devices with those features. Other floating, collapsible, fish retaining devices featuring elaborate closing and locking arrangements that appear to fulfill some unmet fishermen's needs are also described in Sawlsville's U.S. Pat. No. 4,251,943 dated Feb. 24, 1981 and Nelson et al.'s U.S. Pat. No. 4,890,413 dated Jan. 2, 1990. But, by comparison, the instantly disclosed invention is remarkable for its structural simplicity, ease of transport and facile adaptation to all fishing environments.

SUMMARY OF THE INVENTION

Specifically, the invention disclosed herein is a collapsible containment device that can be neatly folded and easily transported by sports fishermen to lakes, rivers and streams and used as a live well for the storage of fish. Essentially, the fish containment device comprises a receptacle having at least one opening for the insertion and removal of fish, and an elongated, tube-like member (hereinafter, simply "tube member") having an opening at each end. A proximal opening is for inserting fish into the tube member and the distal opening communicates with the opening in the receptacle to permit transferring fish from the tube member into the receptacle for storage.

The disclosed containment device is designed to be neatly folded so that it can be stored in the typical tackle box or hand-carried with pole and bait. In use, the receptacle and the distal end of the tube member are designed to be fully submersible, while the proximal end of the tube member remains out of the water while fish are introduced into the tube member and added to the receptacle. This minimizes the trauma to the stored fish, which can be left undisturbed while most activity resulting from the addition of newly caught fish is confined to the tube member of the device.

DESCRIPTION OF THE PREFERRED EMBODIMENTS

Figure 1:
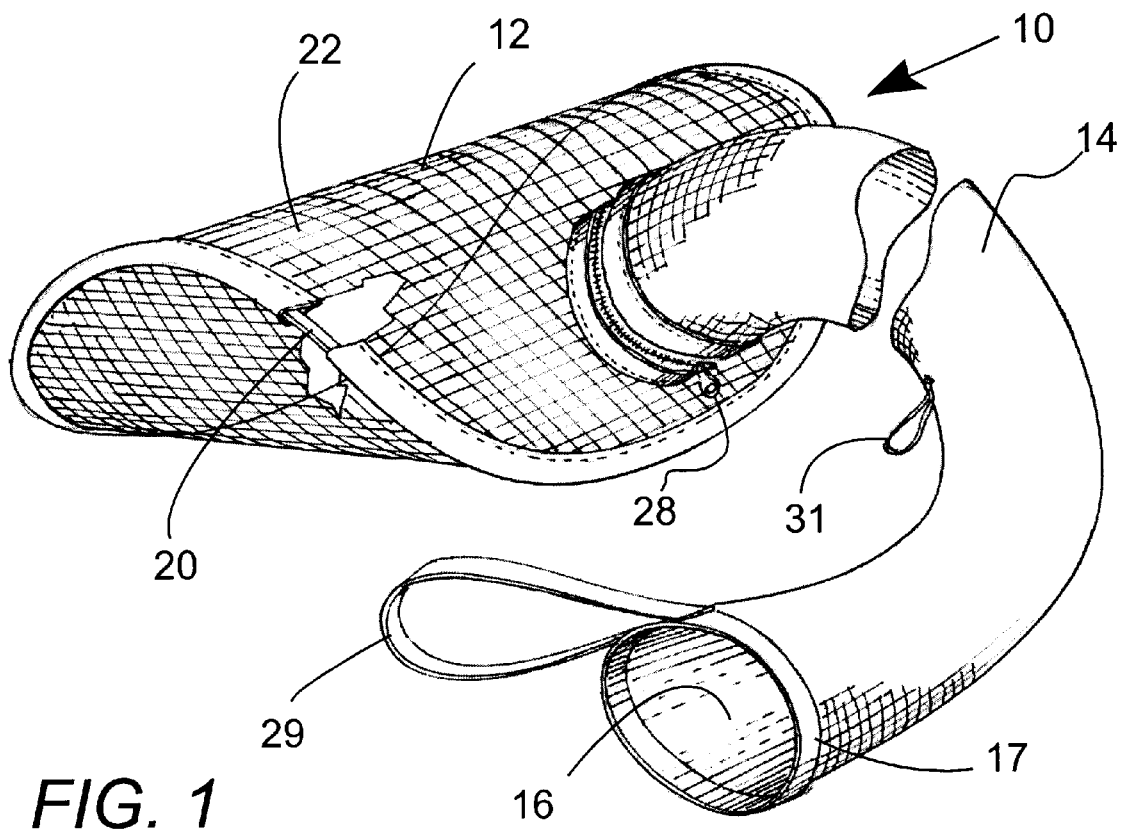
FIG. 1 is a perspective view of a preferred embodiment of the fish containment device in an open or extended mode, but with the tube member sectioned.
Figure 4:
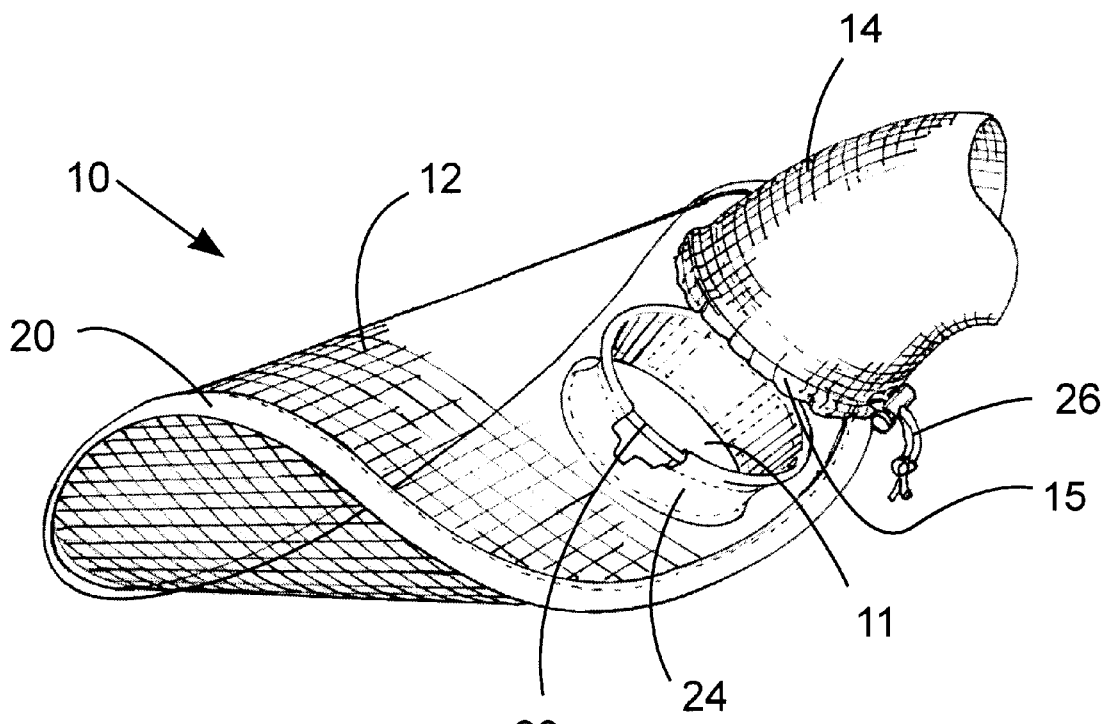
FIG. 4 is a perspective view of the collar of the receptacle and a section of the tube member demonstrating ease of attachment and removal of the tube member from the receptacle.

Reference to the drawing will provide a full appreciation of this uniquely configured, collapsible fish containment device. FIG. 1 depicts a preferred embodiment of the fish containment device 10 in its unfolded condition, ready for use. Prominent features of the device include the receptacle 12 and the tube member 14. In this particular embodiment, the distal opening 15 in the tube member, see FIG. 4, is aligned with the opening 11 in the receptacle to permit the transfer of fish from the interior of the tube member to the interior of the receptacle. In the embodiment depicted in FIG. 1, the alignment is secured with a zipper fastening mechanism 28 that provides a semi-permanent attachment of the tube member 14 to the receptacle 12.

With further regard to the receptacle 12, it is ideally made of a water permeable material. It is designed to be submerged while in use, and ambient water is intended to flow quickly into the receptacle after it is placed in the water. Preferably, the receptacle 12 is fabricated from a durable mesh material 22 such as a knitted monofilament, high-density polyethylene material, commonly known as "shade cloth" (mfd. by Roxford Fordell) to provide years of reliable service in rugged environments. As the name suggests, this material provides a measure of shade reducing the amount of stress on stored fish. The desired mesh material 22 can be fabricated and formed to assume any of a variety of shapes and sizes, but recent experimentation suggests that a suitable receptacle 12 can be fashioned from two identically-sized, oval-shaped pieces of mesh material, positioned in a 90° orientation, with edges aligned and coincident. The mesh material 22 is then stitched to a tensioned, continuous spring loop 20, encased in a binding 21, as shown in the cutout of FIG. 1, which will, when the spring loop 20 is allowed to expand to form a 3-dimensional, Quonset-like enclosure with sides arching at about 45°. The continuous spring loop 20 can be fashioned from a variety of materials. Typically, it is preferably made from plastic or fiberglass, but a corrosion resistant metal material has also been used successfully.

Figure 5:
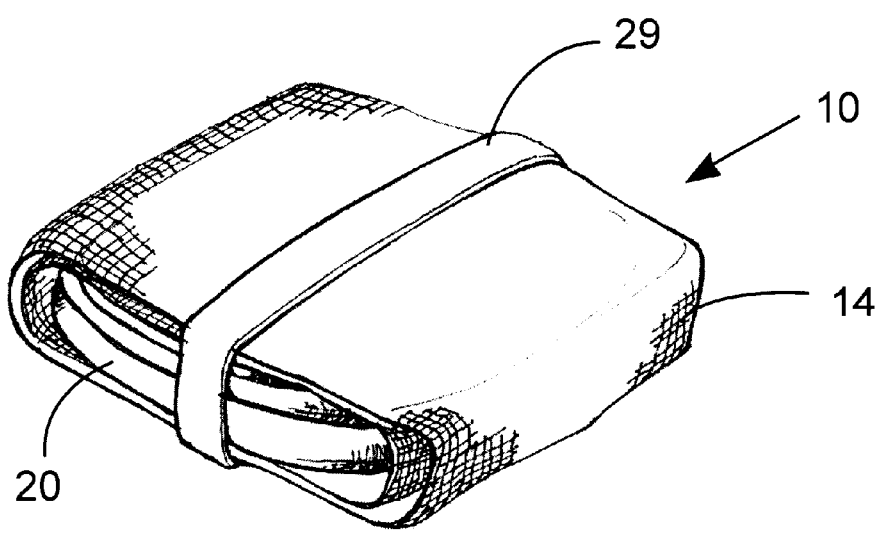
FIG. 5 illustrates the foldable feature of the preferred embodiment of the fish containment device.

When no longer in use the fish storage device 10 can be compacted by holding opposite sides of the spring loop 20 and twisting in opposite directions, causing the receptacle to coil into three small, stacked or layered, congruent circular configurations. The tube member 14, with no rigid member to hold its shape, can then be wrapped around the collapsed receptacle to prevent the receptacle 12 from springing open. To secure the collapsed and folded containment device 10 and permit easy toting and storage, a storage strap 29 is wrapped around the collapsed and folded device. FIG. 5 illustrates how a preferred embodiment of the disclosed device can be folded to form a secure and neat packet.

In use, the fish storage device 10 is unwrapped by simply removing the storage strap 29, and shaken, to allow the tube member 14 to extend to its predetermined, full length, which can be any reasonable length, but preferably between 4 and 8 feet, and to permit the receptacle 12 to expand to its predetermined shape and size. Once expanded and extended, the receptacle 12 can be submerged in the lake or stream and the tube member 14 secured to land, boat or a dock by means of attachment such as loop 31 or the storage strap 29.

In muddy-shore environments, the fisherman can simply toss the receptacle 12 into the lake or stream and use the tube member 14 to bridge the muddy shore while the proximal opening end 16 of the tube member 14 remains with the fisherman on dry land. Fish, after they are removed from the hook, can be inserted through the proximal opening 16 in the tube member 14 and allowed to slide into the receptacle 12 for storage. Fish stored in this way swim freely to avoid injury and can be kept in the receptacle 12 for a reasonable length of time.

When placed into service, the fisherman locates the proximal opening 16 in the tube member 14, inserts the fish, and elevates the proximal end of the tube member 14, which by dint of gravity, urges the fish to move through the tube member 14, through the distal opening 15 in the tube member, through the receptacle opening 11 and, ultimately, to enter the confines of the receptacle 12. The storage device is once again secured to the shore, dock or boat and fishing is resumed.

The tube member 14 is preferably made from a water permeable, mesh-like material, not unlike the material used to construct the receptacle. Most any kind of woven or nonwoven fabric that can tolerate extended exposure to water would be suitable. It is preferred that the tube member 14 be an unsupported, flexible tube that can lay in a flat two-dimensional form and be folded around the receptacle 12 for storage. It is also desirable that the inner surface of the tube member 14 have a smooth hand or finish so that the fish can be smoothly transported from proximal opening 16, through the tube member 14 and into the receptacle 12. An additional subtle feature that has been found to be beneficial is an annular reinforcement 17 defining the proximal opening 16. This provides more substance to the end of the tube member 14 defining its proximal opening 16, which encourages the proximal opening 16 to, in fact, be open, which in turn makes finding the opening and inserting fish easier.

In a preferred embodiment, a tie-off loop 31, conveniently located midway in the length of the tube member 14, can be used to attach the tube member 14 to a boat or dock so that the proximal opening 16 of the tube member 14 can be elevated for the insertion of fish without detaching the tie-off loop 31 from its anchored position. The tie-off loop 31 also allows the receptacle 12 to be maintained at a constant water depth, ensuring that the fish are always kept in the water while the proximal opening 16 of the tube member 14 can be repositioned at will to accept more fish.

Figure 2:
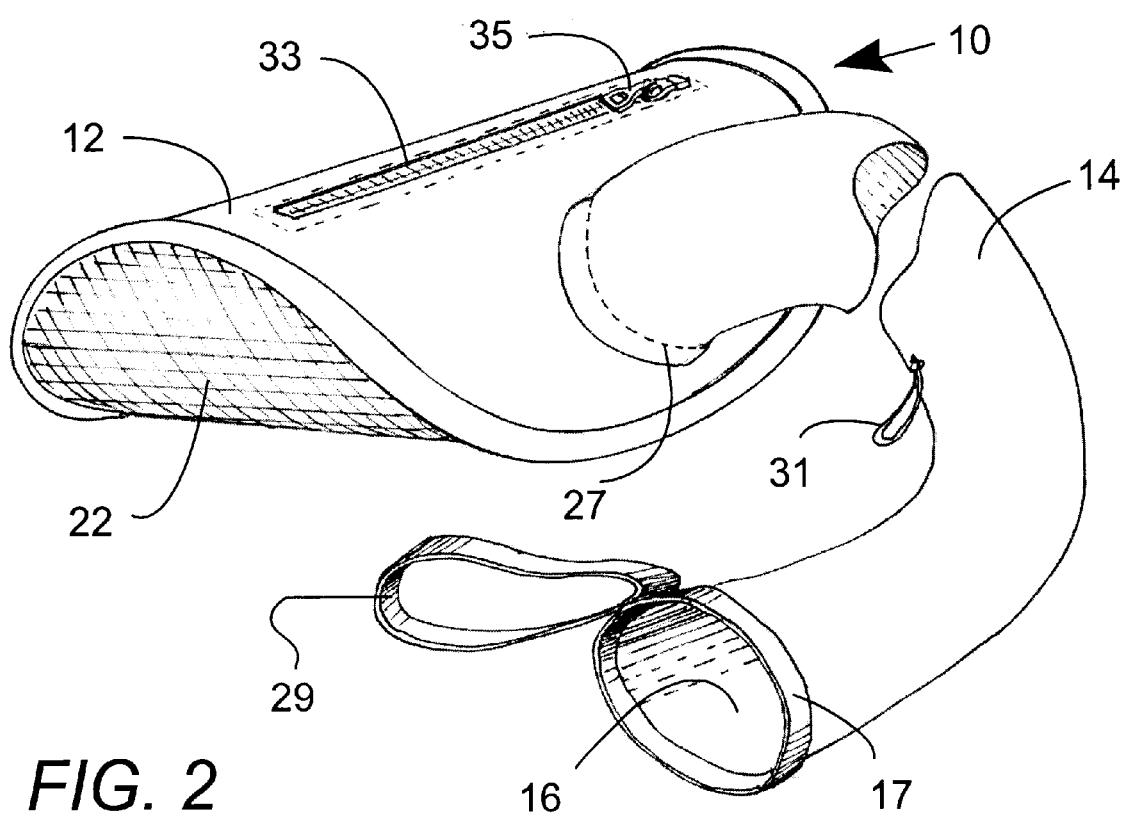
FIG. 2 is a perspective view of an alternative embodiment of the fish containment device showing the tube member sectioned and permanently attached to the receptacle.

FIG. 2 depicts essentially the same fish containment device 10 as FIG. 1 but with an added feature and modification. More apparent is a second opening 33 in the dorsal surface of the receptacle 12. This second opening 33 affords easy access to the fish contained in the receptacle 12, especially when fitted with a zipper mechanism 35 for easy opening and closing. The second opening 33 is especially useful in the embodiment of the containment device 10 where the tube member 14 is permanently attached to the receptacle 12 by stitching 27 or other permanent fastening means.

Figure 3:
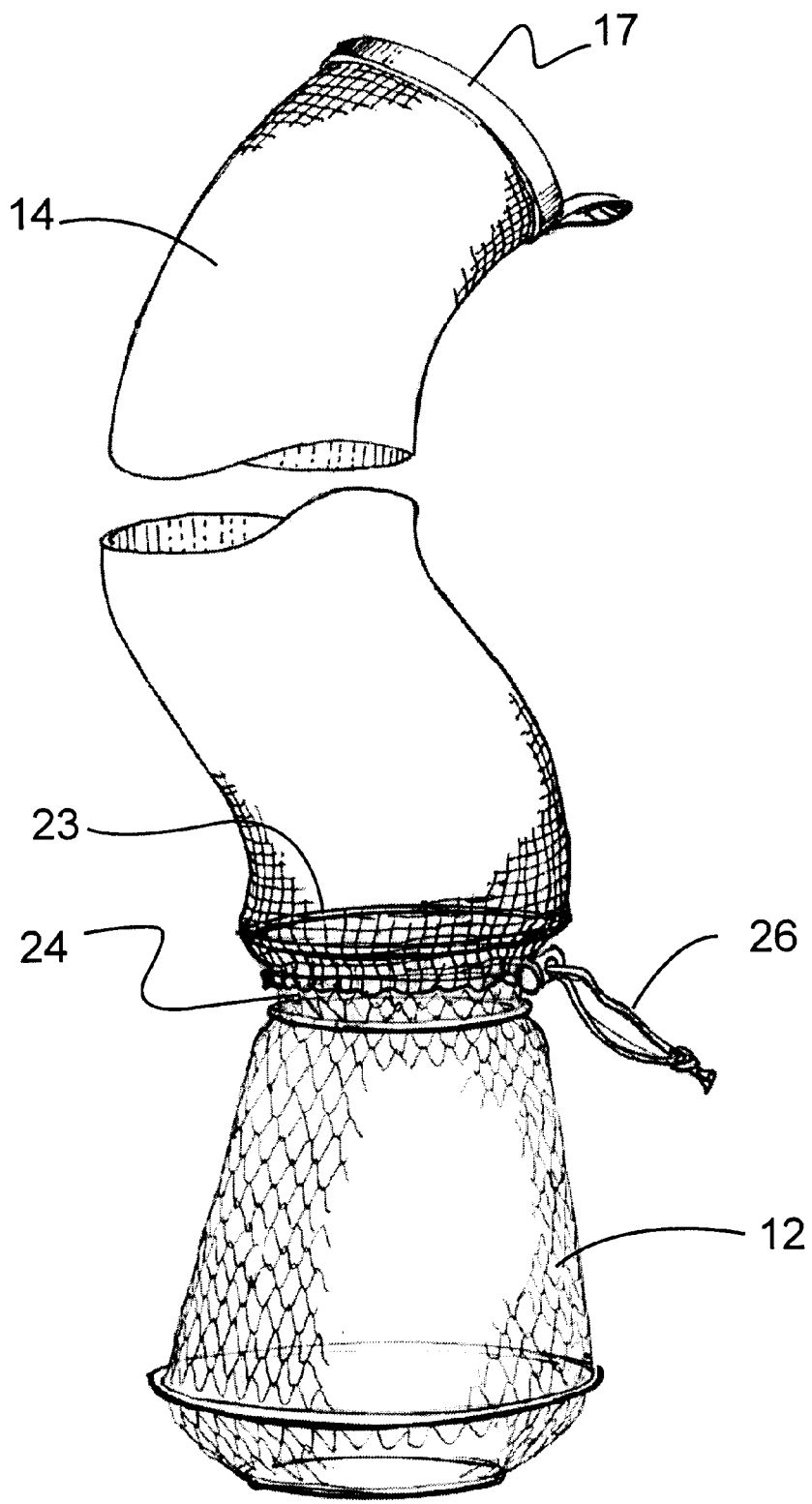
FIG. 3 is an elevated side view of an alternative embodiment of the fish containment device with the tube member in partial section.

FIG. 3 depicts another embodiment of the containment device 10. Notably, in this embodiment the receptacle 12 is the classic, collapsible wire mesh basket that has been used by sport fishermen for years. However, with the addition of the tube member 14, the collapsible wire mesh receptacle 12 is more user-friendly and can now be used in more situations, including those muddy-shore environments, where the preferred embodiments work so well. In the embodiment of FIG. 3, the tube member 14 is removably secured to the collapsible wire basket (receptacle) 12 with a drawstring 26, but permanent and semi-permanent attachments of the tube member 14 to the receptacle 12 are also envisioned.

Using the drawstring 26 as a means for attaching the tube member 14 to the receptacle 12 can also be employed with the preferred collapsible mesh embodiment illustrated in FIG. 1. FIG. 4 depicts how the collapsible mesh housing 22 stretched around the tensioned spring loop 20 can be fitted with a collar 24 extending from the outer surface of the receptacle 12 to provide annular points of attachment for the distal end of the tube member 14 and tightened and secured with a drawstring 26. In this embodiment, the collar 24 is preferably fitted with a rigid collar member 23 to provide structure of substance for the drawstring 26 to encircle.

While the foregoing is a detailed and complete description of the preferred embodiments of the disclosed fish containment device, it should be apparent that numerous variations with modifications can be made and employed to implement the all-important purpose of device without departing from the spirit of the invention, which is fairly defined by the appended claims.

What we claim is:

1. A portable fish containment device for the storage and preservation of fish, which comprises: a water permeable receptacle defined by a tensioned, contiguous loop, said receptacle having at least one opening for the insertion and removal of fish; and a tube member forming an elongated enclosure having an opening at each end: a proximal opening for inserting fish into said tube member and a distal opening in communication with said at least one opening in said receptacle to permit transferring fish from said tube member into said receptacle for storage.

2. The fish containment device according to claim 1 wherein the receptacle is self-erecting.

3. The fish containment device according to claim 1 wherein the continuous loop can be coiled flat for storage.

4. The fish containment device according to claim 1 wherein the tube member is two-dimensional.

5. The fish containment device according to claims 4 wherein the tube member has an annular reinforcement around the proximal opening.

6. The fish containment device according to claim 1 wherein the tube member is semi-permanently attached to the receptacle.

7. The fish containment device according to claim 1 wherein the tube member is permanently attached to the receptacle.

8. The fish containment device according to claim 1 wherein the recptacle is collapsible.

9. The fish containment device according to claim 8 wherein the receptacle is a collapsible wire mesh.

10. The fish containment device according to claim 1 wherein the receptacle has two openings for the insertion and removal of fish.

11. A method of storing game fish in a portable containment device comprising a receptacle defined by a tensioned, continuous loop, said receptacle having at least one opening for the insertion and remnoval of fish; and a tube member forming an elongated enclosure having an opening at each end: a proximal opening and a distal opening in communication with said at least one opening in said receptacle, said method comprising: inserting said fish through the proximal opening in said tube member; and, elevating said tube member to urge said fish through said tube member, through said distal opening in the tube member and through said at least one opening in said receptacle in communication with said distal opening and ultimately into said receptacle for storage.

* * * * *